United States Patent [19]

Benson et al.

[11] Patent Number: 4,982,039

[45] Date of Patent: Jan. 1, 1991

[54] CONVERSION OF HALOGENATED TOXIC SUBSTANCES

[75] Inventors: Sidney W. Benson, Los Angeles, Calif.; Maia A. Vaisman, Chesterfield, Mo.

[73] Assignee: University of Southern California, Los Angeles, Calif.

[21] Appl. No.: 227,475

[22] Filed: Aug. 1, 1988

Related U.S. Application Data

[63] Continuation of Ser. No. 93,060, Sep. 3, 1987, which is a continuation of Ser. No. 832,922, Feb. 24, 1986.

[51] Int. Cl.$^5$ ............................................. C07C 1/00
[52] U.S. Cl. ................................. 585/469; 208/262.1; 208/262.5
[58] Field of Search ............... 585/469, 538, 641, 612, 585/700, 712, 713; 208/262

[56] References Cited

U.S. PATENT DOCUMENTS

| | | | |
|---|---|---|---|
| 1,986,876 | 1/1935 | Baxter et al. | 585/538 |
| 2,649,485 | 8/1953 | Taylor | 585/641 |
| 2,755,322 | 7/1956 | Rust et al. | 585/641 |
| 3,018,309 | 1/1962 | Kejci | 585/539 |
| 4,246,255 | 1/1980 | Granthem | 423/659 |
| 4,301,137 | 11/1981 | Williams et al. | 423/481 |
| 4,338,870 | 7/1982 | Lanier, Jr. | 110/346 |
| 4,416,767 | 11/1983 | Jordan | 585/469 |
| 4,675,464 | 6/1987 | Rogers | 585/538 |

FOREIGN PATENT DOCUMENTS

| | | | |
|---|---|---|---|
| 36650 | 3/1977 | Japan | 585/469 |
| 510450 | 8/1939 | United Kingdom | 585/641 |
| 823956 | 11/1959 | United Kingdom | 585/538 |
| 1350727 | 4/1974 | United Kingdom . | |
| 1443989 | 7/1976 | United Kingdom . | |
| 1503239 | 3/1978 | United Kingdom . | |

OTHER PUBLICATIONS

EPA Journal, Controlling PCB's-A New Approach, Jul.-Aug. 1981.
Chem. Abstracts, vol. 82, 1975, 142517r.
Chem. Abstracts, vol. 91, 1979, 123478y.

Primary Examiner—Olik Chaudhuri
Assistant Examiner—James M. Hunter, Jr.
Attorney, Agent, or Firm—Michael B. Farber; Sheldon & Mak

[57] ABSTRACT

A method for the conversion of chlorinated organic compounds by gas-phase pyrolysis in a reducing atmosphere to produce hydrogen chloride in the essential absence of chlorinated hydrocarbons.

20 Claims, 1 Drawing Sheet

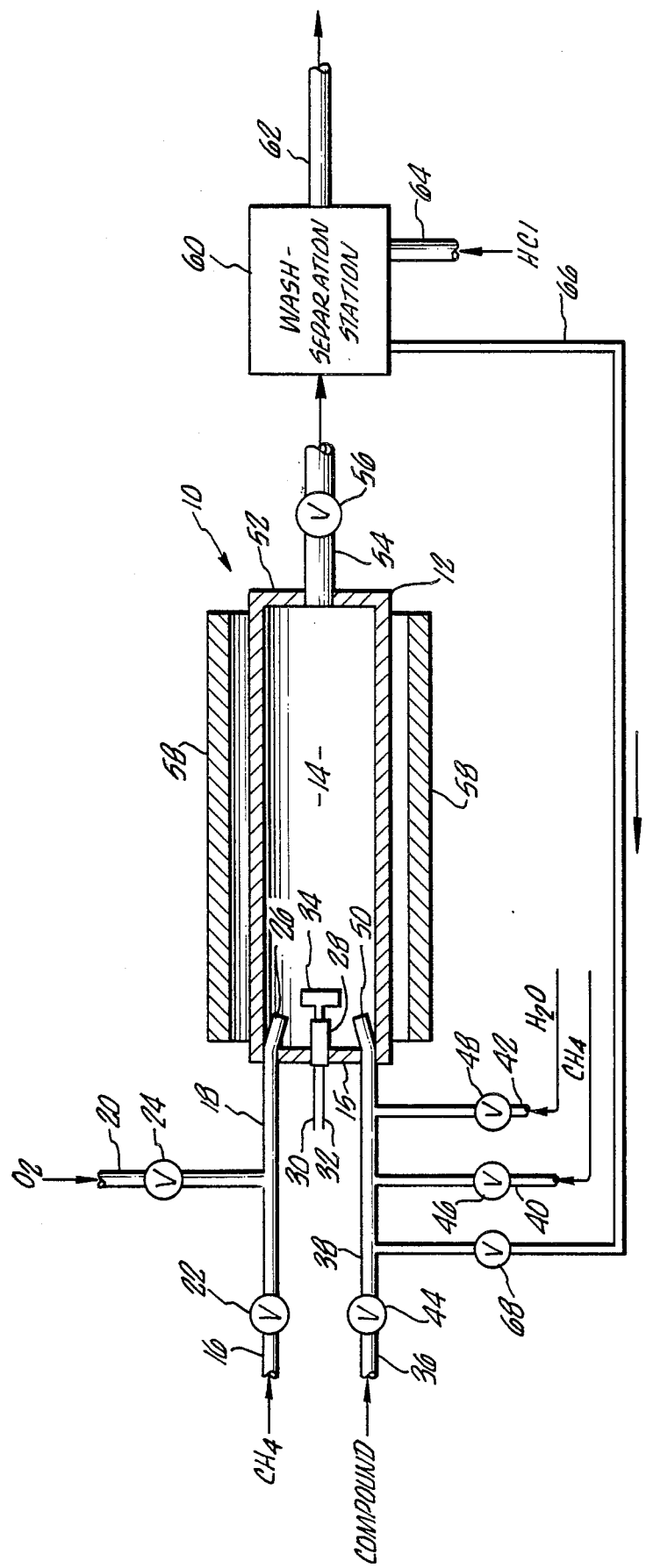

CONVERSION OF HALOGENATED TOXIC SUBSTANCES

This application is a continuation of co-pending application Ser. No. 07/093,060 filed Sept. 3, 1087; which was a continuation of Ser. No. 06/832,922 filed Feb. 24, 1986; which was a continuation-in-part of Ser. No. 612,202 filed May 21, 1984.

FIELD OF THE INVENTION

This invention pertains generally to the field of organic chemistry and, in particular, to the detoxification of hazardous waste.

BACKGROUND AND SUMMARY OF THE INVENTION

Waste disposal from the chemical, agricultural and other industries is a serious contemporary problem. In particular, there are many chemical wastes such as various halogenated hydrocarbons which are not biodegradable, and thus must either be stored in secure, specialized areas or incinerated in specially-designed reactors.

For example, incineration systems have been designed for the destruction of halogenated hydrocarbons, and particularly to enable the detoxification of polychlorinated biphenyl (PCB) compounds, the manufacture of which has been discontinued in the United States since 1976 due to their persistence and ecological damage. However, large amounts of such compounds remain in storage, and are thus regarded as a significant hazard.

In one particular process, organic wastes are vaporized and completely or partially oxidized at about 1,000° C. Incombustible ash is discharged directly from the reaction chamber, while off-gases are passed through a secondary combustion chamber at about 1,200° C. whereby the thermal decomposition of the compound is completed. However, this incineration system not only requires two combustion chambers, each of which required a substantial input of energy, but also often fails to totally eliminate the presence of halogenated hydrocarbons in the effluent stream. It appears that this and other previous incineration systems, which provide for the combustion of halogenated hydrocarbons in the presence of air, form free chlorine gas in the combustion chamber which then reforms halogenated hydrocarbons in the exit stream. Even though the initial hazardous compound may have been degraded by these reactions, any halogenated hydrocarbon is dangerous and products such as chlorinated hydrocarbons which form within the combustion chambers due to the presence of free chlorine gas still present an impediment to the safe disposal of incineration products. Thus, if the ash formed is not clean, it must be reprocessed and retested, and the "dirty" ash must be properly encapsulated and stored until a safe disposal method becomes available.

The present invention provides a process for the disposal of halogen-containing organic compounds such as carbon tetrachloride, chloroform, trichloroethane, tetrachloroethylene, methylenechloride, the various freons, polychlorinated biphenyls, dioxins and others, by conversion to compounds which pose no environmental hazard.

Specifically, a method is provided for the disposal of halogen-containing organic compounds, which comprises pyrolizing the compound in a reducing atmosphere at a temperature in the range of about 825°-1,125° C. In particular, the described reaction temperature may be formed by the combustion of methane and oxygen, the methane being in a stoichiometric excess of that required to react with the oxygen, thus providing the reducing atmosphere.

The reducing atmosphere may be formed by mixing methane and the compound to be converted, said compound having been vaporized according to known methods, in a reaction vessel formed from a suitable refractory material. The required temperature may be provided by external heaters about the reaction vessel, or may be provided by the burning of the methane with limited amounts of oxygen within the reaction vessel. However, it should be noted that the methane must be in a stoichiometric excess of that required to react with the oxygen in accordance with the formula $CH_4 + 2O_2 \rightarrow CO_2 + 2H_2O$. Under such conditions, the halogen-carbon bonds will be broken and the halogens will react with the hydrogen from the methane to form hydrogen chloride, and all organic compounds will be converted to mixtures of hydrogen, ethylene, acetylene and benzene with smaller amounts of carbon and higher aromatics. Due to the fact that excess oxygen is not present within the reaction vessel, dioxins and other chlorinated hydrocarbons are not produced or reformed. The hydrogen chloride can be stripped from the gas stream after suitable heat exchange with water, alkali, lime or generally basic wash, and the hydrocarbons and carbon may be used for fuel or chemical purposes.

It should be understood that the reducing atmosphere may be provided by use of reactants other than methane, e.g., hydrogen, but as methane is widely available and easier to use, the detailed description hereinafter set forth will be described with respect to methane. When hydrogen is used to provide the reducing atmosphere, the required temperature can be provided by the combustion of some of the hydrogen with oxygen in accordance with the equation $2H_2 + O_2 \rightarrow 2H_2O$. This is analogous to the combustion of methane to provide the required temperature.

BRIEF DESCRIPTION OF THE DRAWING

The accompanying drawing illustrates the present process schematically and by way of example, includes an apparatus suitable for carrying out the process according to this invention.

DETAILED DESCRIPTION

As required, a detailed illustrative embodiment of the invention is disclosed herein. However, it is to be understood that this embodiment merely exemplifies the invention which may take forms that are different from the specified embodiment disclosed. Therefore, specific structural and functional details are not to be interpreted as necessarily limiting, but rather as forming a basis for the claims which define the scope of the invention.

The process operates by heating the compounds to be degraded in a reducing atmosphere at temperatures of at least 1,000° C. for about one second. The reactor may be heated externally to maintain this temperature, such as by methane heaters or the like, or may be heated internally by burning methane or other fuels with oxygen to provide the required reaction temperatures, in the presence of an excess of fuel which produces reductive pyrolysis of the added chlorinated compound. Alternatively, the reductive mixture (excess fuel and organic halide) can be alternated with the oxidative heating so that the exit streams from the alternative processes may be kept separate.

More specifically and referring to the accompanying drawing, a reactor 10 is provided including a gas impervious casing 12 which defines an inner elongate reaction chamber or zone 14. As the hydrogen chloride produced in the zone 14 is corrosive, the casing 12 should be coated internally with a ceramic such as aluminum oxide, silica or the like, or with metallic carbides, borides or nitrides. The reactor 10 includes at an end 15 a gas inlet conduit 16 for introducing methane into a first inlet tube 18, and a second gas inlet 20 for introducing oxygen into the tube 18. The gas inlet conduits 16 and 20 are provided with flow metering valves 22 and 24, respectively, for controlling the flow of the methane and oxygen into the tube 18 and thereafter to a burner tip 26 within the zone 14 in proportions which provide the required oxidative heating therein. Generally, a flame temperature of from about 1625° to 2100° C. will provide sufficient heat. A bushing 28 is inserted through the reactor wall at the end 15 through which extend electrically conducting wires 30 and 32 connected to a resistance wire 34 within the reaction zone 14 which is disposed in proximity with the oxidative heating tip 26. Alternatively, a spark coil or other igniting means may be used.

The reactor 10 also includes an inlet 36 for introducing the halide containing compounds or waste material into a second inlet tube 38 as well as inlet conduits 40 and 42 for the introduction of methane and water vapor, respectively. The inlets 36, 40 and 42 are provided with metering valves 44, 46 and 48, respectively, for controlling the flow of the respective gases through the inlet tube 38 to a tip 50 within the zone 14. An opposite end 52 of the reactor 10 is formed with an outlet means 54 for withdrawing product gases from the zone 14 and is fitted with a metering outlet valve 56. Preferably, the reaction is conducted to withdraw the product so as to maintain the residence time required for conversion, generally about two to five seconds. Accordingly, the input valves 22, 24, 46, 48 and 68 and the metering outlet valve 56 are adjusted to maintain a pressure within the zone 14 that is approximately atmospheric. However, the throughput may be increased by appropriate adjustment of said valves to provide superatmospheric pressure within the reactor 10.

Heat exchange means 58 are provided for controlling the temperature within the zone 14 comprising, in this case, insulating means to maintain the desired temperature within the zone 14. Alternatively, the heat exchange means 58 could comprise methane heaters, not shown, to externally heat the casing 12 and the zone 14. Alternatively, the means 58 could comprise electrical heating coils or cooling coils of various types if required. To further assist in controlling the temperature within the zone 14, water may be metered into the tube 38 from the inlet 42 to partially quench the oxidative heating within the zone 14.

Also illustrated in the drawing is a wash and separation station 60 for fractionation of the reaction products, as well as conduits 62 and 64 for conveying the dehalogenated hydrocarbons and carbon waste, and hydrogen chloride, respectively, to storage or disposal. The station 60 also includes a conduit 66 for recycling any of the compound which has not been dehalogenated through a metering valve 68 to the inlet tube 38 for reprocessing.

In operation, metered stoichiometric quantities of methane and oxygen are introduced into the inlet tube 18 through the inlet conduits 16 and 20, wherein the gases mix and flow to the tip 26 and thereafter into the reaction zone 14. Metered amounts of the compound to be dehalogenated are directed through the inlet conduit 36 into the tube 38, along with sufficient amounts of methane gas through the conduit 40 to provide a stoichiometric excess of fuel, and therefore a reducing atmosphere, within the zone 14. Water may be added through the conduit 42 in order to control the temperature within the zone 14, if required. Subsequent to the introduction of combustible amounts of methane gas and oxygen, or air, into the zone 14, current is applied to the conducting wires 30 and 32 in order to cause the resistance wire 34 to glow sufficiently to ignite the gas mixture at the confluence of the flow from the tips 26 and 50. Alternatively, a spark or other ignition means may be employed.

It should be understood that various methods and apparatus may be employed to introduce the described gases into the zone 14. For example, stoichiometric mixtures of fuel and oxygen may be introduced through a first inlet, and excess fuel and the compound introduced, respectively, through second and third inlets directly into the zone 14. Also, the fuel, oxygen and compound may be introduced separately, or through a single inlet. It is preferred that the waste mixture or compounds be properly analyzed and homogenized, if required, before introduction into the apparatus 10. The processing may be required to ensure that the level of inorganic compounds is not excessive. For example, certain non-toxic water-soluble materials such as salt and lime should not be introduced in large quantities, as such materials can react with the refractory lining to form a glassy coating which may reduce the thermal efficiency of the casing 12. It is also preferred to introduce the compound into the conduit 36 in a gas-phase state, produced by the heating and/or vaporization of wastes which are in liquid or solid phases.

In addition to hydrogen halides, a major component of the effluent from the reaction zone 14 includes the dehalogenated compound introduced therein, as well as small amounts of additional compounds and elements. For example, water vapor and oxides of carbon may be formed as a result of the combustion process, and if sulphur is present within the compound or is otherwise introduced to the zone 14, oxides of sulphur will be formed. If air is employed as an oxygen source the noncombustible components will be oxidized, e.g., to oxides of nitrogen. All of these oxides, being soluble in water and essentially acidic in water solution, may be removed from the effluent stream by the wash-separation station 60 along with the hydrogen chloride.

In addition to the above-mentioned products of the reaction, carbonaceous compounds may be formed either from the degradation of the dehalogenated hydrocarbon or from accompanying impurities. For example, ethylene, acetylene and higher molecular weight hydrocarbons are produced, including some carbon in the form of soot. Any carbon which accumulates within the reactor can be oxidized and removed periodically by passing air through the reactor at temperatures in excess of 675° C.

Using the above procedure, the reaction time is very fast, generally being accomplished in several seconds. It is preferred to maintain a residence time in the hot zone of the reactor for from two to ten seconds.

As described, the products of the reaction are separated and recovered at the wash-separation station 60. Methods and apparatus for separating hydrogen chloride and other water-soluble gases from hydrocarbons are known. For example, one can refer to Gorin et al., U.S. Pat. No. 2,488,083. Fractionaters may also be employed for the removal of light gases from the reaction product.

Preferably, the reaction proceeds by the cleavage of carbon-halogen bonds in a reducing atmosphere in the absence of a catalyst, with the consequent production of hydrogen halides and dehalogenated hydrocarbons therefrom. In the particular reactions described herein, hydrogen chloride is produced by the degradation of particular chlorinated hydrocarbons, carbon tetrachloride and chlorobenzene, these compounds having been selected as being exemplary of the described process. Other halogenated hydrocarbons have weaker carbon-halogen bonds, or are dehalogenated by mechanisms which permit lower activation energies, than the compounds specifically set forth herein.

Based on the methods of analyzing complex chain reactions described by Benson in *Foundations of Chemical Kinetics,* McGraw-Hill (1960) and rate data summarized in *Kinetic Data on Gas Phase Unimolecular Reactions,* Benson et al., NSRD, NBS, 21, 1970, both of which are hereby incorporated by reference, carbon tetrachloride is the easiest chlorinated hydrocarbon to pyrolize and chlorobenzenes are the most difficult. Other chlorinated compounds such as chloroform, trichloroethane, tetrachloroethylene, methylene chloride and halogenated or chlorinated aromatic compounds, e.g. polychlorinated biphenyls and dioxins, have carbon-halogen bond energies which fall between those of the exemplary compounds and are therefore within the scope of the described examples. In addition, iodinated and brominated hydrocarbons are degraded at lower temperatures and are converted to unhalogenated hydrocarbons and hydrogen iodide and hydrogen bromide at temperatures, respectively, of about 200° C. and 100° C. lower than those described with respect to chlorinated organic compounds.

The following examples will further illustrate the invention.

EXAMPLE ONE

Using the apparatus schematically shown in the accompanying drawing, carbon tetrachloride is pyrolized with methane in a reaction zone heated by the combustion of methane and oxygen. The methane is present in an amount in stoichiometric excess of the oxygen to produce a reducing atmosphere, and the ratio of carbon tetrachloride to methane is maintained at a ratio of about one to three, about 25 weight percent carbon tetrachloride. The reactor is maintained at about 1025° C. and the throughput maintained so that a residence time of about three seconds is provided. The exit stream contains ethylene, acetylene, benzene, hydrogen and some higher molecular weight hydrocarbons as well as some carbon in the form of soot. The exit stream contains all the chlorine originally introduced as carbon tetrachloride in the form of hydrogen chloride, i.e., the hydrogen chloride gas amounted to about 65 mol percent of the exit gases.

EXAMPLE TWO

In this example, chlorobenzene is chosen as a typical example of an aromatic chlorine-containing compound. In addition, it is known as the most difficult to pyrolize of all the chlorine-containing organics. Two moles (about 21 weight percent) of methane for each mole of chlorobenzene was employed, and the gases were passed through a reaction zone at a temperature of 1125° C., with a residence time of about three seconds. The exit stream contained principally benzene and ethylene with all the chlorine as hydrogen chloride. Additional products include acetylene, hydrogen, heavier unsaturated hydrocarbons and carbon.

In brief review, it will be seen that a process for the degradation of halogen-containing compounds has been provided which is simple to conduct, economical and efficient due in part to the lack of need for catalysts in the reaction zone, and in which all of the chlorine is converted to hydrogen chloride which is easily separated and neutralized.

I claim:
1. A method for conversion of a halogen-containing organic compound to hydrogen halide which comprises the steps of:
   (a) contacting a compound selected from the group consisting of carbon tetrachloride, chloroform, and tetrachloroethylene with a reducing atmosphere comprising a source of hydrogen, the contacting occurring in a reaction zone in the absence of a catalyst;
   (b) maintaining a temperature of at least 825° C. in the reaction zone; and
   (c) pyrolyzing the compound by reacting the reducing atmosphere with the compound in the absence of free oxygen in the reaction zone to form, as an effluent, a hydrogen halide in the essential absence of halogenated hydrocarbons, the hydrogen halide being formed by breakage of the halogen-carbon bonds of the halogen-containing organic compound and reaction of the halogen generated thereby with the hydrogen from the source of hydrogen.

2. The method of claim 1 further comprising producing the temperature and the reducing atmosphere at a first end of a single reaction chamber by combusting methane or hydrogen with oxygen, the methane or hydrogen being in a stoichiometric excess of that required to react with the oxygen in accordance with the reaction $CH_4 + 2O_2 \rightarrow CO_2 + 2H_2O$ for methane or $2H_2 + O_2 \rightarrow 2H_2O$ for hydrogen.

3. The method of claim 1 or 2 wherein the temperature in the reaction zone is at least about 1025° C.

4. The method of claim 3 wherein the temperature in the reaction zone is from about 1025° C. to 1125° C.

5. A method for the conversion of a chlorine containing organic compound selected from the group consisting of chlorobenzene, polychlorinated biphenyls and chlorinated dioxins to hydrogen chloride, which comprises the steps of:
   (a) contacting said compound with a reducing atmosphere comprising a source of hydrogen, the contacting occurring in a reaction zone in the absence of a catalyst;
   (b) maintaining a temperature of at least 825° C. in the reaction zone; and
   (c) pyrolyzing said compound non-catalytically by reacting the reducing atmosphere with said compound in the absence of free oxygen in the reaction zone to form, as an effluent, hydrogen chloride in the essential absence of chlorinated hydrocarbons, the hydrogen chloride being formed by breakage of the chlorine-carbon bonds of the chlorine-containing organic compound and reaction of the chlorine generated thereby with the hydrogen from the source of hydrogen.

6. The method of claim 5 further comprising producing the temperature and the reducing atmosphere at a first end of a single reaction chamber by combusting methane and oxygen, the methane being in a stoichiometric excess of that required to react with the oxygen in accordance with the reaction $CH_4 + 2O_2 \rightarrow CO_2 + 2H_2O$, and wherein the chlorine in the chlorine-containing compound reacts with hydrogen from the methane to form the hydrogen chloride.

7. The method of claim 5 or 6 wherein the temperature in the reaction zone is from about 1025° to about 1125° C.

8. A method for the conversion of a halogen-containing organic compound to hydrogen halide which comprises the steps of:
   (a) contacting the compound with a reducing atmosphere comprising a source of hydrogen selected from the group consisting of molecular hydrogen and methane, the contacting occurring in a reaction zone in the absence of a catalyst;
   (b) maintaining a temperature of at least 825° C. in the reaction zone; and
   (c) pyrolyzing the compound by reacting the reducing atmosphere with the compound in the absence of free oxygen in the reaction zone to form, as an effluent, a hydrogen halide in the essential absence of halogenated hydrocarbons, the hydrogen halide being formed by breakage of the halogen-carbon bonds of the halogen generated thereby with the hydrogen from the source of hydrogen.

9. The method of claim 8 wherein the source of hydrogen is methane and wherein the molar ratio of methane to halogen is at least 2:1.

10. The method of claim 9 wherein the molar ratio of methane to halogen is at least 10:1.

11. The method of claim 1 wherein the source of hydrogen is methane and wherein the molar ratio of methane to halogen is at least 2:1.

12. The method of claim 11 wherein the molar ratio of methane to halogen is at least 10:1.

13. The method of claim 5 wherein the source of hydrogen is methane and wherein the molar ratio of methane to chlorine is at least 2:1.

14. The method of claim 13 wherein the molar ratio of methane to chlorine is at least 10:1.

15. A method for the conversion of a halogen-containing organic compound to hydrogen halide which comprises the steps of:
   (a) combusting methane or hydrogen and oxygen at a first end of a single reaction chamber to produce a reducing atmosphere comprising a source of hydrogen and a temperature of at least 825° C. in a reaction zone, the methane or hydrogen being in a stoichiometric excess of that required to react with oxygen in accordance with the reaction $CH_4 + 2O_2 \rightarrow CO_2 + 2H_2O$ for methane or $2H_2 + O_2 \rightarrow 2H_2O$ for oxygen;
   (b) contacting a compound selected from the group consisting of carbon tetrachloride, chloroform, and tetrachloroethylene with the reducing atmosphere, the contacting occurring in the reaction zone in the absence of a catalyst; and
   (c) pyrolzing the compound by reacting the reducing atmosphere with the compound in the absence of free oxygen in the reaction zone to form, as an effluent, a hydrogen halide in the essential absence of halogenated hydrocarbons, the hydrogen halide being formed by breakage of the halogen-carbon bonds of the halogen-containing organic compound and reaction of the halogen generated thereby with the hydrogen from the source of hydrogen.

16. A method for the conversion of a chlorine-containing organic compound selected from the group consisting of chlorobenzene, polychlorinataed biphenyls and chlorinated dioxins to hydrogen chloride, which comprises the steps of:
   (a) combusting methane and oxygen or air at a first end of a single reaction chamber to produce a reducing atmosphere comprising a source of hydrogen and a temperature of at least 825° C. in a reaction zone, the methane being in a stoichiometric excess of that required to react with the oxygen in accordance with the reaction $CH_4 + 2O_2 \rightarrow CO_2 + 2H_2O$;
   (b) contacting said compound with the reducing atmosphere, the contacting occurring in the reaction zone in the absence of a catalyst; and
   (c) pyrolyzing said compound non-catalytically by reacting the reducing atmosphere with said compound in the absence of free oxygen in the reaction zone to form, as an effluent, hydrogen chloride in the essential absence of chlorinated hydrocarbons, the hydrogen chloride being formed by breakage of the chlorine-carbon bonds of the chlorine generated thereby with hydrogen from the methane.

17. A method for the conversion of a halogen-containing organic compound to hydrogen halide which comprises the steps of:
   (a) combusting methane as a source of hydrogen and oxygen at a first end of a single reaction chamber to produce a reducing atmosphere and a temperature of at least 825° C. in a reaction zone, the methane being in a stoichiometric excess of that required to react with the oxygen in accordance with the reaction $CH_4 + 2O_2 \rightarrow CO_2 + 2H_2O$;
   (b) contacting the compound with the reducing atmosphere, the contacting occurring in the reaction zone in the absence of a catalyst; and
   (c) pyrolyzing the compound by reacting the reducing atmosphere with the compound in the absence of free oxygen in the reaction zone to form, as an effluent, a hydrogen halide in the essential absence of halogenated hydrocarbons, the hydrogen halide being formed by breakage of the halogen-carbon bonds of the halogen-containing organic compound.

18. A method for the conversion of a bromine-containing organic compound to hydrogen bromide which comprises the steps of:
   (a) contacting the compound with a reducing atmosphere comprising a source of hydrogen selected from the group consisting of molecular hydrogen and methane, the contacting occurring in a reaction zone in the absence of a catalyst;
   (b) maintaining a temperature of at least 725° C. in the reaction zone; and (c) pyrolyzing the compound by reacting the reducing atmosphere with the compound in the absence of free oxygen in the reaction zone to form, as an effluent, hydrogen bromide in the essential absence of brominated hydrocarbons, the hydrogen bromide being formed by breakage of the bromine-carbon bonds of the bromine-containing organic compound and the reaction of the bromine generated thereby with the hydrogen from the source of hydrogen.

19. The method of claim 2 or 6 wherein the combusting of the methane or hydrogen and oxygen occurs essentially simultaneously with the contacting of the compounds with the reducing atmosphere.

20. The method of claim 15, 16, or 17 wherein steps (a) and (b) occur essentially simultaneously.

* * * * *